US012597350B2

(12) United States Patent
Maruyama et al.

(10) Patent No.: US 12,597,350 B2
(45) Date of Patent: Apr. 7, 2026

(54) COLLISION ALERT DEVICE AND COLLISION ALERT METHOD

(71) Applicant: HONDA MOTOR CO., LTD., Tokyo (JP)

(72) Inventors: Masaki Maruyama, Wako (JP); Katsuhito Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 90 days.

(21) Appl. No.: 18/437,598

(22) Filed: Feb. 9, 2024

(65) Prior Publication Data

US 2024/0304088 A1 Sep. 12, 2024

(30) Foreign Application Priority Data

Mar. 9, 2023 (JP) ................................ 2023-036859

(51) Int. Cl.
*G06F 17/00* (2019.01)
*G08G 1/16* (2006.01)

(52) U.S. Cl.
CPC ............ *G08G 1/166* (2013.01); *G08G 1/164* (2013.01)

(58) Field of Classification Search
CPC ...... G08G 1/166; G08G 1/164; G08G 1/0104; G08G 1/0125
USPC .......................................................... 701/301
See application file for complete search history.

(56) References Cited

U.S. PATENT DOCUMENTS 6,794,987 B2 * 9/2004 Schiffmann ........... G01S 13/505 340/917
8,154,422 B2 * 4/2012 Hsu ....................... G08G 1/161 340/905
11,345,340 B2 * 5/2022 Shalev-Shwartz .......................... B60W 60/0027
12,139,132 B2 * 11/2024 Shalev-Shwartz .... B60W 10/20
2014/0176714 A1 * 6/2014 Li .......................... G08G 1/166 348/148
2018/0151077 A1 * 5/2018 Lee ........................ G08G 1/161

FOREIGN PATENT DOCUMENTS

JP 2019-91382 A 6/2019
WO WO-2023194801 A1 * 10/2023 ...... B60W 30/18163

OTHER PUBLICATIONS

Collision Avoidance Theory (Year: 2005).*

* cited by examiner

*Primary Examiner* — Ronnie M Mancho
(74) *Attorney, Agent, or Firm* — Rankin, Hill & Clark LLP

(57) ABSTRACT

A collision alert device includes a calculation part repeatedly calculating, at a prescribed time interval, a time-to-collision obtained by dividing a distance between moving objects by a relative velocity of two moving objects, the distance between moving objects being a distance between the two moving objects, and an output part outputting an alert in at least one of the two moving objects as a condition of the time-to-collision being equal to or less than a predetermined threshold, the relative velocity is a centripetal relative velocity of a moving velocity of each of the two moving objects, the centripetal relative velocity being calculated from a centripetal velocity that is a component along a line segment connecting a position of each of the two moving objects, and the time-to-collision is a centripetal time-to-collision obtained by dividing a distance between the two moving objects by the centripetal relative velocity.

10 Claims, 7 Drawing Sheets

COLLISION ALERT DEVICE AND COLLISION ALERT METHOD

INCORPORATION BY REFERENCE

The present application claims priority under 35 U.S.C. § 119 to Japanese Patent Application No. 2023-036859 filed on Mar. 9, 2023. The content of the application is incorporated herein by reference in its entirety.

BACKGROUND OF THE INVENTION

Field of the Invention

The present invention relates to a collision alert device and a collision alert method for outputting an alert for a collision risk between moving objects.

Description of the Related Art

In recent years, efforts have become more active for providing access to sustainable transportation systems that take into consideration people in a vulnerable position, from among traffic participants. There has been a focus on research and development to further improve traffic safety and convenience through research and development in relation to preventative safety technology in order to achieve this purpose.

Japanese Patent Application Laid-Open No. 2019-91382 discloses a traveling support device, in the case where another vehicle moves in a road, which crosses a road in which one's own vehicle is traveling, toward an intersection in front of one's own vehicle, for displaying a plurality of shielding images on a front glass by a head-up display, the plurality of shielding images overlapping at a position of intersecting roads seen from a driver, and the plurality of shielding images being separated at a prescribed interval. The driver can perceive an approach of another vehicle to the intersection, with the aid of the separated shielding images.

Incidentally, in preventative safety technology, there is a problem of avoiding, in a driving behavior, a contact risk with an object in the surroundings of one's own vehicle, by notifying a driver of the contact risk at an appropriate point in time.

In particular, the sensitivity of a driver can be reduced, for a possibility of colliding with another vehicle approaching from a different direction to an advancing direction of one's own vehicle, such as another vehicle moving in a road, which crosses a road in which one's own vehicle is traveling, toward an intersection in front of one's own vehicle, or a possibility of colliding with another vehicle that may be approaching from a different direction.

The present invention, in order to solve this problem, has an object of appropriately notifying a driver of a collision risk between moving objects moving in different directions, by quantitatively evaluating an extent of approach between these moving objects. Also, the present invention, by extension, contributes to the development of sustainable transportation systems.

SUMMARY OF THE INVENTION

One aspect of the present invention is a collision alert device including a calculation part for repeatedly calculating a time-to-collision at a prescribed time interval, the time-to-collision being obtained by dividing a distance between moving objects by a relative velocity of two moving objects, the distance between moving objects being a distance between the two moving objects, and an output part for outputting an alert in at least one of the two moving objects as a condition of the time-to-collision being equal to or less than a predetermined threshold, the relative velocity is a centripetal relative velocity of a moving velocity of each of the two moving objects, the centripetal relative velocity being calculated from a centripetal velocity that is a component along a line segment connecting a position of each of the two moving objects, and the time-to-collision is a centripetal time-to-collision obtained by dividing a distance between the two moving objects by the centripetal relative velocity.

According to another aspect of the present invention, the output part outputs an alert in at least one of the two moving objects, at a time when the centripetal time-to-collision is equal to or less than a predetermined threshold, and an intersecting point of two traveling lines is in front within a range of a predetermined prescribed distance from a present position of either of the two moving objects, the two traveling lines extending along a moving direction of each of the two moving objects with each of the two moving objects as a start point.

According to another aspect of the present invention, the output part issues an alert in at least one of the two moving objects, at a time when two traveling regions have a mutually overlapping region in front within a range of the prescribed distance from a present position of each of the two moving objects, the two traveling regions being belt-type regions each having a width equivalent to a body width of each corresponding moving object with each of the two traveling lines as a center line, and at a time when the centripetal time-to-collision is equal to or less than a predetermined threshold, even if the intersecting point is not within a range of the prescribed distance from a present position of each of the two moving objects.

According to another aspect of the present invention, the output part issues an alert in at least one of the two moving objects, at a time when an advancing direction of one of the two moving objects is opposite to an advancing direction of the other of the two moving objects, and a direction indicator of at least one moving object of the two moving objects shows a moving direction changing to a direction approaching the traveling line of the other moving object, and at a time when the centripetal time-to-collision becomes equal to or less than a predetermined threshold, even if the intersecting point is not within a range of the prescribed distance from a present position of each of the two moving objects, and the two traveling regions do not have a mutually overlapping region within a range of the prescribed distance from a present position of each of the two moving objects.

According to another aspect of the present invention, the output part issues an alert in at least one of the two moving objects, at a time when the two moving objects move in the same direction, and a direction indicator of at least one moving object of the two moving objects shows a moving direction changing to a direction approaching the traveling line of the other moving object, and at a time when the centripetal time-to-collision becomes equal to or less than a predetermined threshold, even if the intersecting point is not within a range of the prescribed distance from a present position of each of the two moving objects, and the two traveling regions do not have a mutually overlapping region within a range of the prescribed distance from a present position of each of the two moving objects.

According to another aspect of the present invention, after an alert is issued in one moving object of the two moving objects, at a time when a moving velocity of the one moving object becomes zero, the output part stops the alert issued in the one moving object as a condition where there is no other moving object approaching the one moving object from a rear in an advancing direction of the one moving object within a prescribed distance range from the one moving object.

According to another aspect of the present invention, after an alert is issued in one moving object of the two moving objects, the output part continues the issuance of the alert in the one moving object, until there is no other traffic participant within a prescribed distance range from the one moving object, or until a moving velocity of the one moving object becomes zero.

According to another aspect of the present invention, the collision alert device is mounted in one moving object of the two moving objects, and the output part issues an alert in the one moving object.

Another aspect of the present invention is a collision alert method executed by a computer of a collision alert device, the collision alert method includes the steps of repeatedly calculating a time-to-collision at a prescribed time interval, the time-to-collision being obtained by dividing a distance between moving objects by a relative velocity of two moving objects, the distance between moving objects being a distance between the two moving objects, and outputting an alert in at least one of the two moving objects as a condition of the time-to-collision being equal to or less than a predetermined threshold, the relative velocity is a centripetal relative velocity of a moving velocity of each of the two moving objects, the centripetal relative velocity being calculated from a centripetal velocity that is a component along a line segment connecting a position of each of the two moving objects, and the time-to-collision is a centripetal time-to-collision obtained by dividing a distance between the two moving objects by the centripetal relative velocity.

According to the present invention, a collision risk between moving objects moving in different directions can be appropriately notified to a driver, by quantitatively evaluating an extent of approach between these moving objects.

DETAILED DESCRIPTION OF THE PREFERRED EMBODIMENTS

Figure 1:
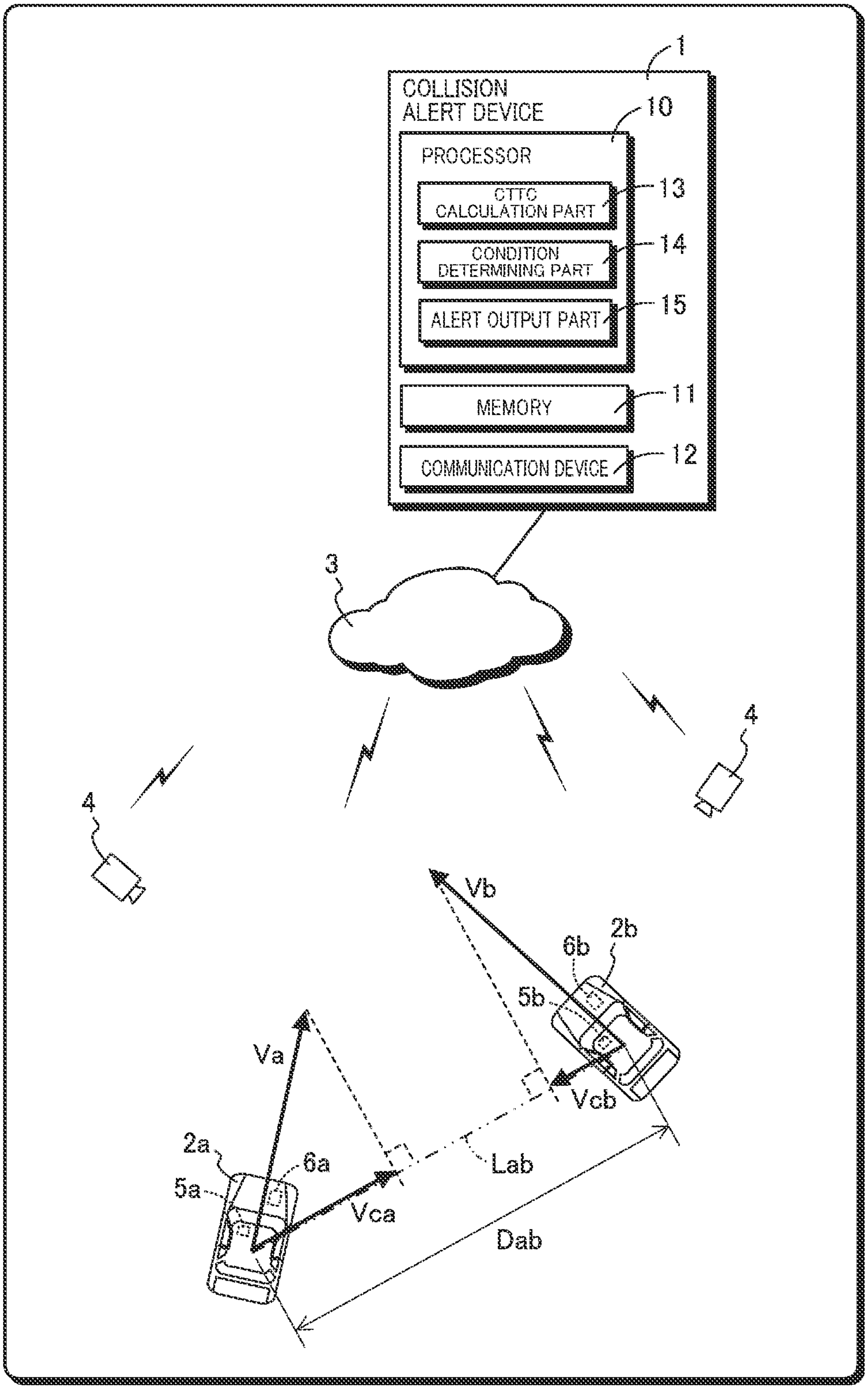
FIG. 1 is a figure showing a configuration of a collision alert device according to an embodiment of the present invention.

Hereinafter, an embodiment of the present invention will be described by referring to the drawings.

FIG. 1 is a figure showing a configuration of a collision alert device 1 according to an embodiment of the present invention.

The collision alert device 1 is, for example, a server device, and the collision alert device 1 is communicably connected to each of a plurality of moving objects, directly and/or via a communication network 3 such as the Internet, the plurality of moving objects including moving objects 2*a* and 2*b*. The collision alert device 1 may also be communicably connected to one or a plurality of cameras 4 that image a space or region in which the plurality of moving objects including the moving objects 2*a* and 2*b* can move.

The collision alert device 1 determines a presence or absence of a collision risk between the moving object 2*a* and the moving object 2*b*, and outputs an alert to the moving objects 2*a* and 2*b*.

Note that the collision alert device 1 is a server device in the present embodiment, but not limited to this, and the collision alert device 1 may be included in either of the moving objects (for example, the moving object 2*a*), and issue an alert in the moving object.

In the present embodiment, the moving objects 2*a* and 2*b* are, for example, automobiles. Moreover, the camera 4 can be, for example, a monitoring camera that constitutes a road infrastructure installed in an urban area or highway.

Note that the moving objects 2*a* and 2*b* are not limited to automobiles, and can be any vehicles to be boarded and used by a person. For example, the moving objects 2*a* and 2*b* may be other land moving objects that travel on land, the other land moving objects including two-wheeled vehicles, bicycles and the like. Alternatively, the moving objects 2*a* and 2*b* may be marine moving objects such as ships moving in the sea, aerial moving objects such as aircrafts, or space moving objects such as spacecrafts.

The moving objects 2*a* and 2*b* respectively include Human Machine Interface (HMI) devices 5*a* and 5*b* for issuing an alert to a passenger of the moving object, within the interior of the moving object. The HMI devices 5*a* and 5*b* can be, for example, display devices or speakers included in the interior of the moving object.

Moreover, the moving objects 2*a* and 2*b* respectively include wireless communication devices 6*a* and 6*b*. The moving objects 2*a* and 2*b* each measure a present position, velocity, and moving direction of the respective moving object 2*a* or 2*b* at a prescribed time interval, in accordance with conventional technology, and the moving objects 2*a* and 2*b* each transmit information of the measured present position, velocity, and moving direction to the outside of the moving object by the wireless communication device 6*a* or 6*b*. Moreover, at the time when respective direction indicators of the moving objects 2*a* and 2*b* are operated, the moving objects 2*a* and 2*b* each transmit operation information of the direction indicator to the outside of the moving object by the wireless communication device 6*a* or 6*b*. Moreover, in response to receiving a request from the collision alert device 1, the moving objects 2*a* and 2*b* each transmit information of a moving object width (for example, a vehicle width) of the moving object 2*a* or 2*b* to the collision alert device 1, the moving object width being a maximum moving object width in a direction orthogonal to a moving direction.

The collision alert device 1 has a processor 10, a memory 11, and a communication device 12. The memory 11 is configured, for example, with a volatile and/or non-volatile semiconductor memory, and/or with a hard disk device or the like. The communication device 12 is a transmitter and a receiver for performing wireless communication and/or wired communication, in order for the collision alert device 1 to communicate with the moving objects 2*a* and 2*b* and the camera 4.

The collision alert device 1 receives information of a velocity and moving direction transmitted from each of the moving objects 2*a* and 2*b* at a prescribed time interval, as well as operation information of the direction indicators by the communication device 12. Moreover, the collision alert device 1 acquires images of the moving objects 2*a* and 2*b* from the camera 4, by the communication device 12, the images of the moving objects 2*a* and 2*b* being photographed by the camera 4 at a prescribed time interval. Moreover, the collision alert device 1 transmits a request to obtain information of a moving object width, to the moving objects 2*a* and 2*b*, by the communication device 12, and in response to this, the collision alert device 1 receives information of the moving object width transmitted from the moving objects 2*a* and 2*b*.

The processor 10 is, for example, a computer that includes a CPU or the like. The processor 10 may be configured to have a ROM to which programs are written, a RAM for temporary storage of data or the like. Also, the processor 10 includes a CTTC calculation part 13, a condition determining part 14, and an alert output part 15, as functional elements or functional units.

These functional elements included in the processor 10 are implemented, for example, by the processor 10 that is a computer, the processor 10 executing a program stored in the memory 11. Note that the program can be stored in an any computer-readable storage medium. Alternatively, all or part of the functional elements included in the processor 10 can be respectively constituted of hardware including one or more electronic circuit components.

The CTTC calculation part 13 corresponds to a calculation part in the present disclosure. The CTTC calculation part 13 repeatedly calculates a time-to-collision (TTC), by dividing a distance between moving objects Dab by a relative velocity between the moving objects 2*a* and 2*b*, at a prescribed time interval, the distance between moving objects Dab being a distance between the moving objects 2*a* and 2*b*.

In the present embodiment, in particular, the CTTC calculation part 13 calculates centripetal velocities Vca and Vcb from respective moving velocities Va and Vb of the two moving objects 2*a* and 2*b*, at a prescribed time interval, the centripetal velocities Vca and Vcb being velocity components along a line segment Lab connecting each of the positions of the two moving objects 2*a* and 2*b*, and the CTTC calculation part 13 calculates a centripetal relative velocity Vcr from the calculated centripetal velocities Vca and Vcb, the centripetal relative velocity Vcr being a relative velocity along the line segment Lab of the moving objects 2*a* and 2*b*. Also, the CTTC calculation part 13 calculates a centripetal time-to-collision CTTC at a prescribed time interval, as with the time-to-collision, the centripetal time-to-collision CTTC obtained by dividing the distance between moving objects Dab between the two moving objects 2*a* and 2*b* by the centripetal relative velocity Vcr, by the following Equation (1).

[Equation 1]

$$CTTC = \frac{D_{ab}}{V_{cr}} = \frac{D_{ab}}{V_{ca} - V_{cb}} \tag{1}$$

Note that the centripetal velocity Vca represents the velocity in a direction from the moving object 2*a* toward the moving object 2*b* along the line segment Lab by a positive value, and the centripetal velocity Vcb represents the velocity in a direction from the moving object 2*b* toward the moving object 2*a* along the line segment Lab by a negative value. Therefore, the CTTC calculated by Equation (1) becomes a positive value at the time when the moving objects 2*a* and 2*b* approach one another. In the example shown in FIG. 1, Vca is a positive value, Vcb is a negative value, and CTTC is a positive value.

The moving velocities Va and Vb used for the calculation of the centripetal velocities Vca and Vcb are each, for example, a velocity vector, and the moving velocities Va and Vb can be calculated from a velocity and moving direction of each of the moving objects 2*a* and 2*b*, which the collision alert device 1 acquires from the moving objects 2*a* and 2*b* at a prescribed time interval. Alternatively, the moving velocities Va and Vb may be calculated from an image of each of the moving objects 2*a* and 2*b*, which the collision alert device 1 acquires from the camera 4 at a prescribed time interval. The image of each of the moving objects 2*a* and 2*b* may also be acquired from another moving object that includes a camera, the another moving object being present in the surroundings of the moving objects 2*a* and 2*b*.

The extent of approach between the two moving objects 2*a* and 2*b* moving in different directions can be quantitatively understood, in the collision alert device 1 of the present embodiment, using the centripetal time-to-collision.

The condition determining part 14 determines a relative condition between moving objects that include the moving objects 2*a* and 2*b*, based on information for a present position, velocity, and moving direction of the each of the moving objects acquired from the moving objects 2*a* and 2*b* and/or based on operation information of the direction indicator of each of the moving objects 2*a* and 2*b*. In addition or alternatively, the condition determining part 14 may determine the condition, based on an image of each of the moving objects 2*a* and 2*b* as well as an image of the surroundings of the moving objects 2*a* and 2*b*, each image being acquired from the camera 4 or another moving object.

The condition determined by the condition determining part 14 is used in the alert output part 15, which will be described below.

Figure 2:
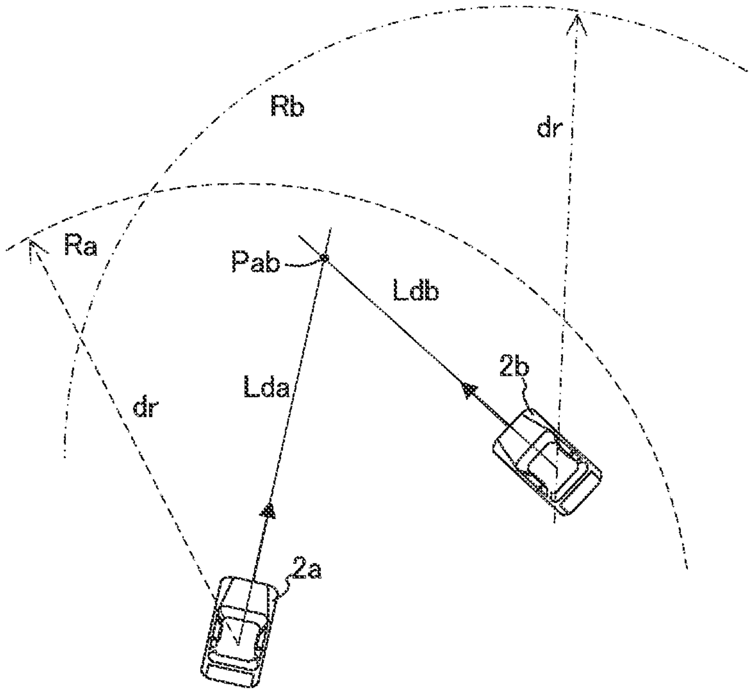
FIG. 2 is a figure showing a first example of a scene in which an alert is issued in a moving object.

Specifically, as shown in FIG. 2, the condition determining part 14 determines whether an intersecting point Pab of two traveling lines Lda and Ldb, which extend along a moving direction of each of the moving objects 2*a* and 2*b* with each of the two moving objects 2*a* and 2*b* as a start point, is in front within a range of a range Ra (inside of an arc shown by the illustrated dotted line) or in front within a range of a range Rb (inside of an arc shown by the illustrated dash-dot line), the range Ra being a range of the predetermined prescribed distance dr (for example, 100 meters) from the present position of the moving object 2*a* and the range Rb being a range of the predetermined prescribed distance dr from the present position of the moving object 2*b*. Here, in front within a range of the range Ra means in front along an advancing direction of the moving object 2*a*, and also means within the range of the range Ra. Moreover, in front within a range of the range Rb means in front along an advancing direction of the moving object 2*b*, and also means within the range of the range Rb. Hereinafter, the same applies.

Figure 3:
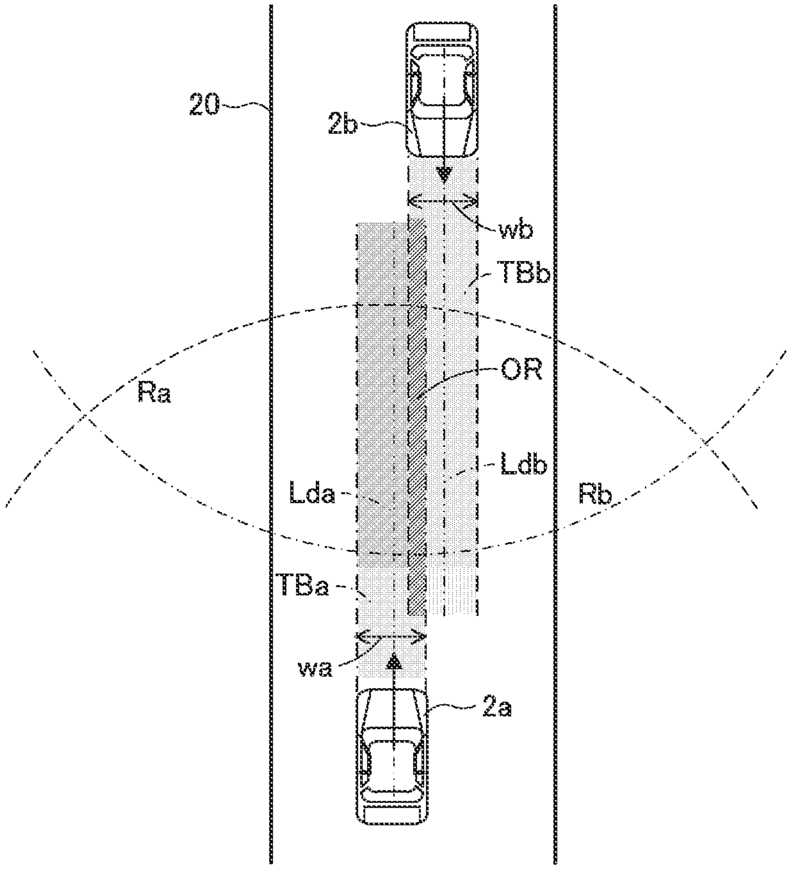
FIG. 3 is a figure showing a second example of a scene in which an alert is issued in a moving object.

Moreover, as shown in FIG. 3, the condition determining part 14 determines whether two traveling regions TBa and TBb have an overlapping region OR mutually overlapping in front within a range of the range Ra or the range Rb, the two traveling regions TBa and TBb being belt-type regions equivalent to respective body widths wa and wb of the corresponding moving objects 2*a* and 2*b* with each of the two traveling lines Lda and Ldb as a center line.

In this way, in the collision alert device 1, since the number of traffic participants in the surroundings is narrowed down to a range of each prescribed distance dr of the moving objects 2*a* and 2*b*, the number of traffic participants in the surroundings being an evaluation target of a collision risk, the calculation load in the collision alert device 1 can be reduced.

Moreover, the condition determining part 14 determines whether a moving velocity of each of the two moving objects 2*a* and 2*b* becomes zero. Moreover, the condition determining part 14 determines whether an advancing direction of the moving object 2*a* and an advancing direction of the moving object 2*b* are opposite one another or in the same direction as one another.

Moreover, the condition determining part 14 determines whether the direction indicator of at least one moving object (for example, the moving object 2*a*) of the two moving objects 2*a* and 2*b* shows changing a moving direction to a direction approaching the traveling line of the other moving object (for example, the traveling line Ldb of the moving object 2*b*).

Moreover, the condition determining part 14 determines, for each of the two moving objects 2*a* and 2*b*, whether there is another moving object (for example, the moving object 2*b* or a moving object other than this) approaching one moving object (for example, the moving object 2*a*) from behind in an advancing direction of the one moving object, within a range of the prescribed distance dr (for example, 100 meters) from the one moving object.

Moreover, the condition determining part 14 determines, for each of the two moving objects 2*a* and 2*b*, whether there is another traffic participant (the moving object 2*b* and another moving object can be included) within a range of the prescribed distance ds (for example, 5 meters) from the moving object (for example, the moving object 2*a*).

The alert output part 15 corresponds to an output part in the present disclosure.

The alert output part 15 outputs an alert in at least one of the two moving objects 2*a* and 2*b*, based on a condition determination in the condition determining part 14, as a condition of the present centripetal time-to-collision calculated in the CTTC calculation part 13 (hereinafter, simply called the "present centripetal time-to-collision") being a positive value and equal to or less than a predetermined threshold. This alert can be performed, for example, by the HMI device 5*a* or 5*b* included in the moving object 2*a* or 2*b*.

In this way, the collision alert device 1, even in the case where the moving objects 2*a* and 2*b* move in respectively different directions, can appropriately notify a collision risk between these moving objects to a driver, by quantitatively evaluating an extent of approach between these moving objects.

Note that, as described above, the collision alert device 1 is a server device in the present embodiment, but not limited to this, and the collision alert device 1 can be included in either of the two moving objects 2*a* and 2*b*. In this case, the alert output part 15 issues an alert in the moving object, by the HMI device of the moving object in which the collision alert device 1 is included (for example, the HMI device 5*a* of the moving object 2*a*).

Hereinafter, a case in which the alert output part 15 issues an alert will be described.

FIG. 2 shows a first example of a scene in which an alert is issued in the moving object 2*a* and/or the moving object 2*b*.

The alert output part 15 outputs an alert in at least one of the moving objects 2*a* and 2*b*, at the time when the present centripetal time-to-collision is equal to or less than a threshold, and at the time when the intersecting point Pab of the traveling lines Lda and Ldb of the two moving objects 2*a* and 2*b* is either in front within a range of the range Ra centered on the present position of the moving object 2*a* or in front within a range of the range Rb centered on the present position of the moving object 2*b*.

In this way, the collision alert device 1 can issue an alert by accurately determining a possibility of colliding within a range of the prescribed distance dr from each of the moving objects 2*a* and 2*b*, while quantitatively evaluating an extent of approach between the moving objects 2*a* and 2*b*. Moreover, in the collision alert device 1, since an evaluation target of a collision risk is narrowed down to within a range of the range Ra and to within a range of the range Rb, a calculation load can be reduced.

In this way, the collision alert device 1 can issue an alert by accurately determining a possibility of colliding within a range of the prescribed distance dr from each of the moving objects 2*a* and 2*b*, by quantitatively evaluating an extent of approach between the moving objects 2*a* and 2*b*, while reducing a calculation load by narrowing down an evaluation target of a collision risk to within a range of the range Ra and to within a range of the range Rb.

FIG. 3 is a figure showing a second example of a scene in which an alert is issued in the moving object 2*a* and/or the moving object 2*b*. In the scene of FIG. 3, the moving objects 2*a* and 2*b* move in opposite directions in each of two opposing traffic lanes of a road 20.

The alert output part 15 outputs an alert in at least one of the moving objects 2*a* and 2*b*, at the time when the present centripetal time-to-collision is equal to or less than a threshold, and at the time when traveling regions TBa and TBb of the two moving objects 2*a* and 2*b* have an overlapping region OR that mutually overlaps in front within a range of the range Ra or within a range of the region Rb, even if the intersecting point Pab is not within a range of either the range Ra or the range Rb as shown in the scene in FIG. 3.

In this way, the collision alert device 1, similar to the above description, even in the case where the traveling lines Lda and Ldb of the two moving objects 2*a* and 2*b* do not overlap within a range of the prescribed distance dr, can issue an alert by accurately determining the possibility of contact between these two moving objects 2*a* and 2*b*, while reducing a calculation load by narrowing down an evaluation target of a collision risk to within a range of the range Ra and to within a range of the range Rb.

Figure 4:
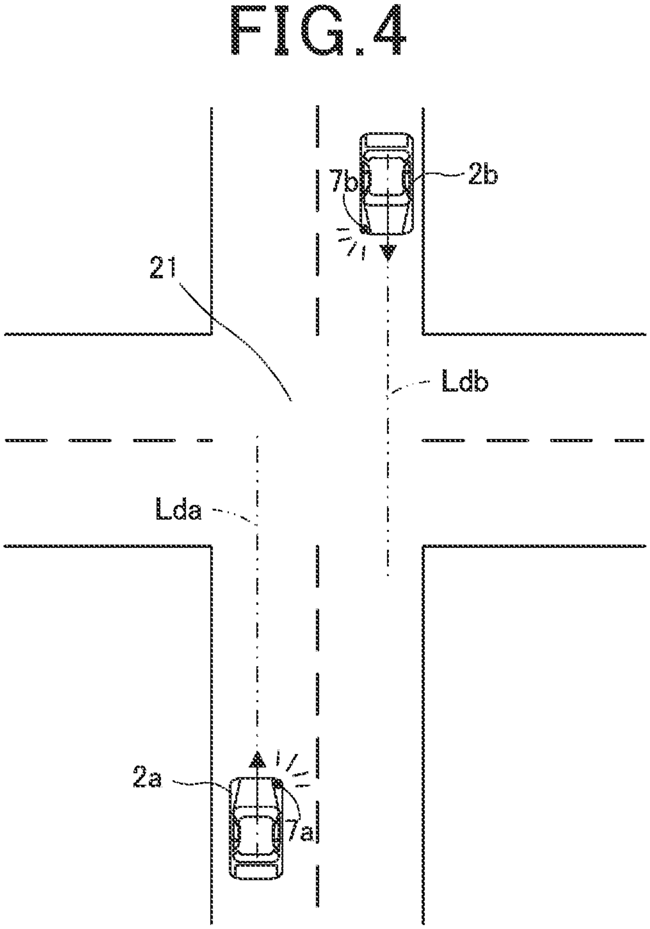
FIG. 4 is a figure showing a third example of a scene in which an alert is issued in a moving object.

FIG. 4 is a figure showing a third example of a scene in which an alert is issued in the moving object 2*a* and/or the moving object 2*b*. In the scene of FIG. 4, the moving objects 2*a* and 2*b* move in mutually opposite directions, across an intersection 21.

The alert output part 15 outputs an alert in at least one of the moving objects 2*a* and 2*b*, at the time when the present centripetal time-to-collision is equal to or less than a threshold, and at the time when an advancing direction of the moving object 2*a* and an advancing direction of the moving object 2*b* are opposite one another, and the direction indicator of at least one moving object of the two moving objects 2*a* and 2*b* (for example, the direction indicator 7*a* of the moving object 2*a* or the direction indicator 7*b* of the moving object 2*b*) shows a moving direction changing to a direction approaching the traveling line of the other moving object (for example, the traveling line Ldb of the moving object 2*b* or the traveling line Lda of the moving object 2*a*), even if there is no intersecting point Pab and overlapping region OR within a range of the ranges Ra and Rb.

In this way, in the case where the moving objects 2*a* and 2*b* are vehicles, for example, the alert output part 15 can issue an alert, for the two vehicles moving in opposing directions in the intersection, by accurately determining a possibility of at least one vehicle approaching in front of an advancing direction of the other vehicle.

Figure 5:
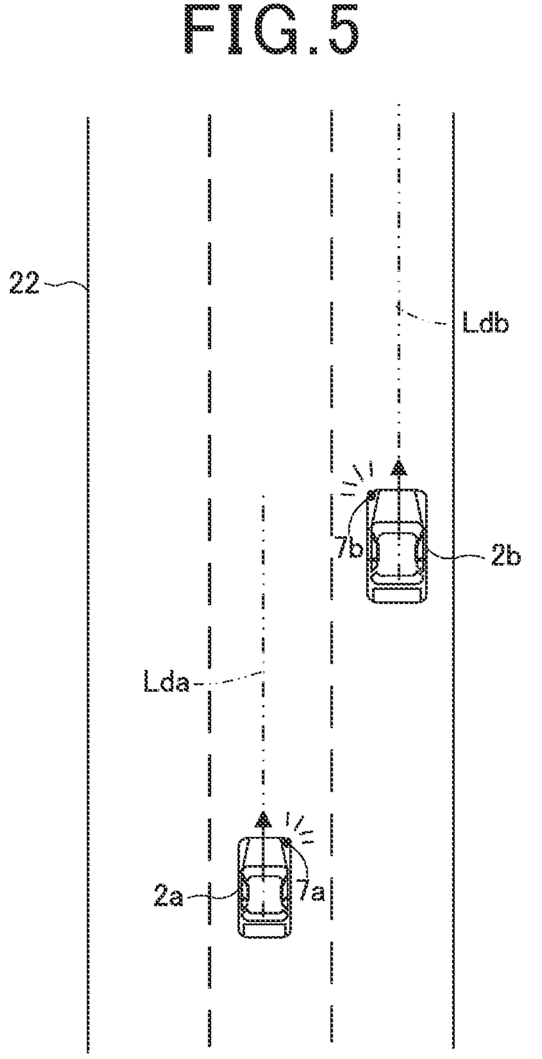
FIG. 5 is a figure showing a fourth example of a scene in which an alert is issued in a moving object.

FIG. 5 is a figure showing a fourth example of a scene in which an alert is issued in the moving object 2*a* and/or the moving object 2*b*. In the scene of FIG. 5, in a road 22 having a plurality of traffic lanes of the same traveling direction, one moving object 2*a* traveling in one traffic lane is behind the other moving object 2*b* traveling in another traffic lane.

The alert output part 15 outputs an alert in at least one of the moving objects 2*a* and 2*b*, at the time when the present centripetal time-to-collision is equal to or less than a threshold, and at the time when the two moving objects 2*a* and 2*b* move in the same direction in a plurality of traffic lanes with a traveling direction being the same, for example, and the direction indicator of at least one moving object of the two moving objects 2*a* and 2*b* (for example, the direction indicator 7*a* of the moving object 2*a* or the direction indicator 7*b* of the moving object 2*b*) shows a moving direction changing to a direction approaching the traveling line of the other moving object (for example, the traveling line Ldb of the moving object 2*b* or the traveling line Lda of the moving object 2*a*), even if there is no intersecting point Pab and overlapping region OR within a range of the ranges Ra and Rb.

In this way, in the case where the moving objects 2*a* and 2*b* are vehicles, for example, for a leading vehicle and a following vehicle traveling in the same direction in a plurality of traffic lanes, the alert output part 15 can issue an alert, by accurately determining a possibility of the leading vehicle and/or the following vehicle approaching to the traffic lane of the following vehicle and/or the leading vehicle.

Figure 6:
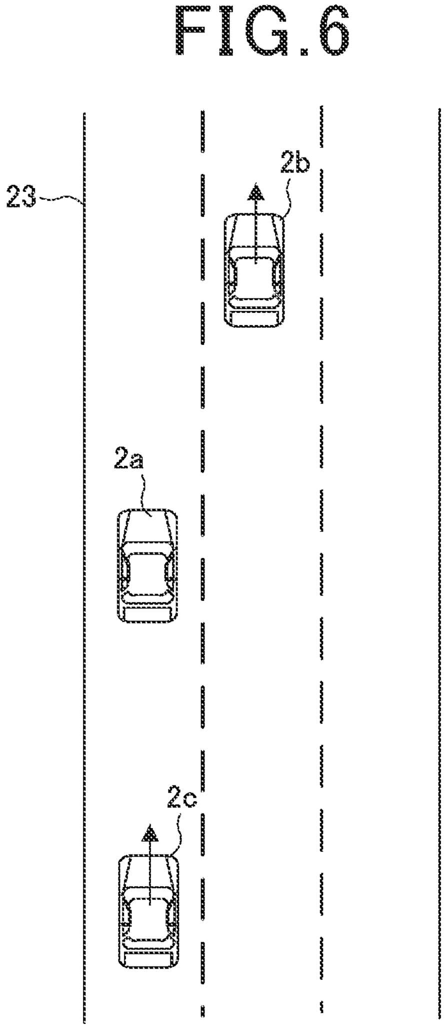
FIG. 6 is a figure showing an example of a scene in which an alert issued in a moving object can be stopped.

FIG. 6 is a figure showing an example of a scene in which an alert issued in the moving object 2*a* and/or the moving object 2*b* can be stopped. In the scene of FIG. 6, the moving object 2*a*, in which an alert is output, stops traveling, and another moving object 2*c* approaching the moving object 2*a* is present behind the moving object 2*a*.

After an alert is issued in one moving object (for example, the moving object 2*a*) of the two moving objects 2*a* and 2*b*, at the time when a moving velocity of the one moving object becomes zero, the alert output part 15 stops the alert issued in the one moving object, as a condition of there being no other moving object (for example, another moving object 2*c* other than the moving objects 2*a* and 2*b*) approaching the one moving object from behind in an advancing direction of the one moving object, within a range of the prescribed distance dr (for example, 100 meters) from the one moving object.

In this way, attention for a possibility of a following moving object (the moving object 2*c* shown in FIG. 6) colliding can be attracted to a passenger of the moving object (the moving object 2*a* in the scene shown in FIG. 6), the passenger having performed a stop operation due to the alert being issued within the interior of the moving object.

Moreover, after an alert is issued in the one moving object (for example, the moving object 2*a*) of the two moving objects 2*a* and 2*b*, the alert output part 15 continues the issuance of the alert in the one moving object, until there is no other traffic participant within a range of the prescribed distance ds from the one moving object, or until a moving velocity of the one moving object becomes zero.

In this way, in the case where the moving objects 2*a* and 2*b* are vehicles, for example, a situation of troubling a driver with a short alert repeating a number of times can be avoided, even in the case where traffic participants are densely packed in the surroundings of the vehicles, and an advancing direction of the vehicle frequently changes in order to avoid these traffic participants.

Figure 7:
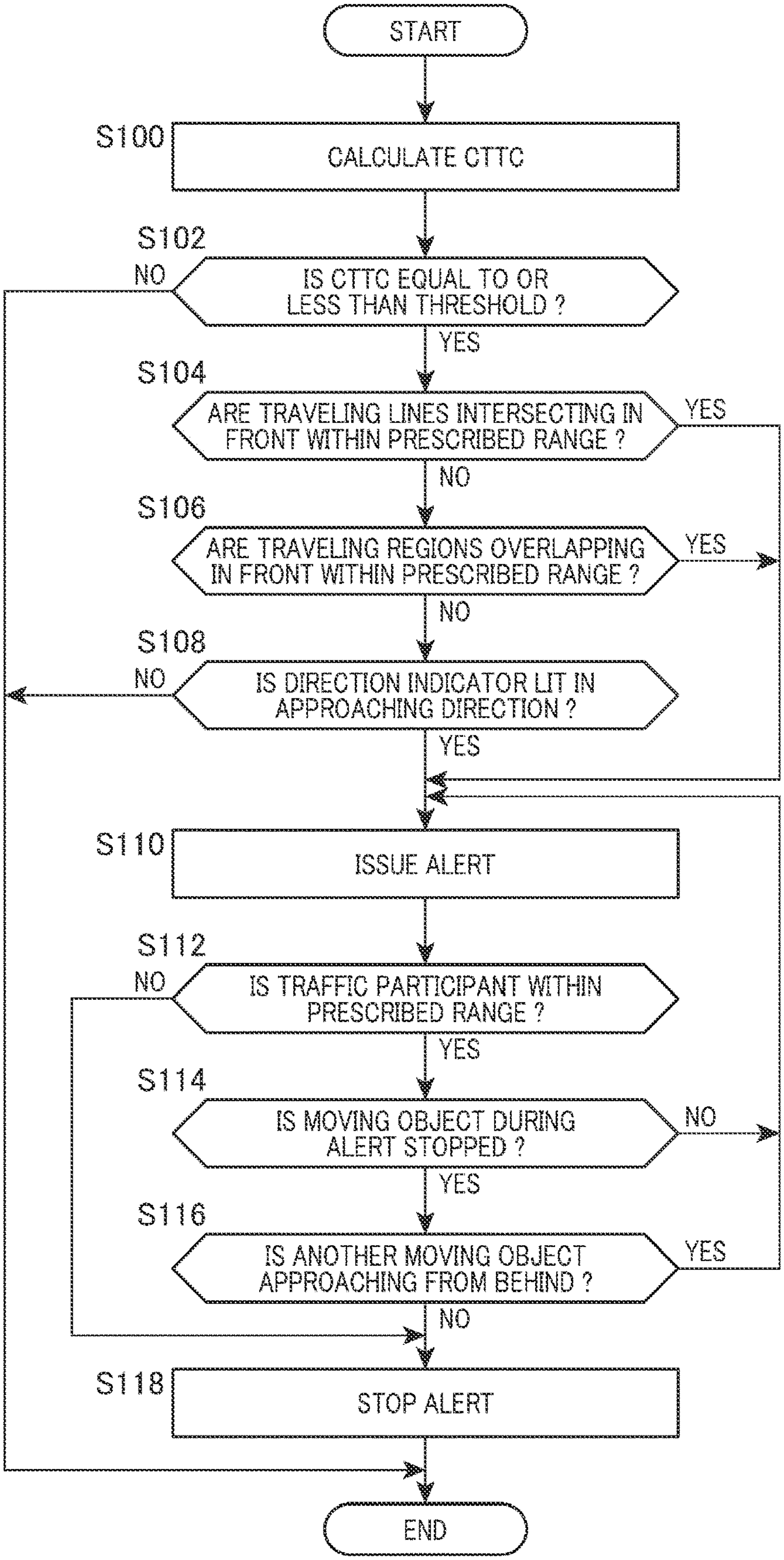
FIG. 7 is a flow chart showing procedures of an alert issuing method executed by an alert issuing device.

Next, a collision alert method executed by the collision alert device 1 will be described. FIG. 7 is a flow chart showing processing procedures of a collision alert method executed by the processor 10 that is a computer of the collision alert device 1. The processes shown in FIG. 7 are repeatedly executed.

Note that, in parallel to the processes shown in FIG. 7, the processor 10 of the collision alert device 1 receives information of a velocity and moving direction transmitted from each of the moving objects 2*a* and 2*b* at a prescribed time interval, as well as operation information of the direction indicator, through the communication device 12. Moreover, in parallel to the processes shown in FIG. 6, the processor 10 of the collision alert device 1 acquires an image of each of the moving objects 2*a* and 2*b* from the camera 4, through the communication device 12, each image of the moving objects 2*a* and 2*b* being photographed by the camera 4 at a prescribed time interval. Moreover, in parallel to the processes shown in FIG. 6, the collision alert device 1 transmits a request to obtain information of a moving object width, to the moving objects 2*a* and 2*b*, through the communication device 12, and in response to this, the collision alert device 1 receives information of the moving object width transmitted from the moving objects 2*a* and 2*b*. Moreover, in parallel to the processes shown in FIG. 6, the condition determining part 14 determines a relative condition between the moving objects that include the moving objects 2*a* and 2*b* as described above, based on each of the received pieces of information.

At the start of the processes of FIG. 7, first, the CTTC calculation part 13 calculates a centripetal time-to-collision (CTTC) between the moving objects 2*a* and 2*b*, at a prescribed time interval (S100). Next, the alert output part 15 determines whether the present CTTC is equal to or less than a prescribed threshold (S102). Then, at the time when the present CTTC is larger than the prescribed threshold (S102, NO), the alert output part 15 ends the present process, without issuing an alert.

On the other hand, at the time when the CTTC is equal to or less than the prescribed threshold (S102, YES), the alert output part 15 determines whether an intersecting point Pab of traveling lines Lda and Ldb of the moving objects 2*a* and 2*b* is present in front within a range of either a range Ra centered on the moving object 2*a* or a range Rb centered on the moving object 2*b*, based on the determination in the condition determining part 14 (S104).

Then, at the time when the intersecting point Pab is not in front within a range of either the range Ra or the range Rb (S104, NO), the alert output part 15 determines whether an overlapping region OR of traveling regions Tba and TBb of the moving objects 2*a* and 2*b* is present in front within a range of either the range Ra centered on the moving object 2*a* or the range Rb centered on the moving object 2*b*, based on the determination of the condition determining part 14 (S106).

Then, at the time when the overlapping region OR is not in front within a range of either the range Ra or the range Rb (S106, NO), the alert output part 15 determines whether a direction indicator of at least one of the moving objects 2*a* and 2*b* shows a change of a moving direction to a direction approaching the traveling line Ldb or Lda of the other moving object 2*b* or 2*a*, based on the determination of the condition determining part 14 (S108).

Then, at the time when both of the direction indicators of the moving objects 2*a* and 2*b* does not show a change of a moving direction to the traveling line Ldb or Lda of the other moving object 2*b* or 2*a* (S108, NO), the alert output part 15 ends the present process.

On the other hand, in step S104, at the time when the intersecting point Pab is within a range of either the range Ra or the range Rb (S104, YES), in step S106, at the time when the overlapping region OR is within the range of either the range Ra or the range Rb (S106, YES), or, in step S108, at the time when the direction indicators of the moving objects 2*a* and 2*b* show a change of a moving direction to the traveling lines Ldb or Lda of the other moving objects 2*b* and 2*a* (S108, NO), the alert output part 15 issues an alert in at least one of the moving objects 2*a* and 2*b* (S110). Note that, as described above, in the case where the collision alert device 1 is mounted in the moving object 2*a* or 2*b*, the alert output part 15 issues an alert in at least the moving object 2*a* or 2*b* in which this collision alert device 1 is mounted.

To continue, the alert output part 15 determines whether there is a traffic participant within a range of the prescribed distance ds from the moving object 2*a* or 2*b* that issued an alert, based on the determination of the condition determining part 14 (S112). Then, at the time when there is a traffic participant within a range of the prescribed distance ds from the moving object 2*a* or 2*b* that issued an alert (S112, YES), in step S110, the alert output part 15 determines whether the moving object 2*a* or 2*b* that issued the alert (hereinafter, called a moving object during alert) stops (for example, the velocity becomes zero), based on the determination of the condition determining part 14 (S114). Then, at the time when the moving object during alert does not stop (S114, NO), the alert output part 15 continues the issuance of the alert by returning to step S110.

On the other hand, at the time when the moving object during alert stops (S114, YES), the alert output part 15 determines whether there is another moving object approaching the moving object during alert from behind (S116). Then, at the time when there is another moving object approaching the moving object during alert from behind (S116, YES), the alert output part 15 continues the issuance of the alert by returning to step S110. On the other hand, when there is no other moving object approaching the moving object during alert from behind (S116, YES), the alert output part 15 stops an alert in the moving object during alert (S118), and ends the present process.

Here, in FIG. 7, the steps S100 and S110 respectively correspond to a calculation step and an output step in the present disclosure.

Other Embodiments

While the collision alert device 1 is a server device in the present embodiment, the collision alert device 1 may be included in any of the moving objects (for example, moving object 2*a*), and issue an alert in this moving object, as described above.

The present invention is not limited to the configurations of the above described embodiment, and can be implemented in various aspects within a range that does not deviate from the spirit of the present invention.

[Configurations Supported by the Embodiments]

The above-stated embodiments support the following configurations.

(Configuration 1) A collision alert device including a calculation part for repeatedly calculating a time-to-collision at a prescribed time interval, the time-to-collision being obtained by dividing a distance between moving objects by a relative velocity of two moving objects, the distance between moving objects being a distance between the two moving objects, and an output part for outputting an alert in at least one of the two moving objects as a condition of the time-to-collision being equal to or less than a predetermined threshold, wherein the relative velocity is a centripetal relative velocity of a moving velocity of each of the two moving objects, the centripetal relative velocity being calculated from a centripetal velocity that is a component along a line segment connecting a position of each of the two moving objects, and the time-to-collision is a centripetal time-to-collision obtained by dividing a distance between the two moving objects by the centripetal relative velocity.

According to the collision alert device of Configuration 1, even in a case where two moving objects move in respectively different directions, the collision alert device can appropriately notify a collision risk between these moving objects to a driver, by quantitatively evaluating an extent of approach between these moving objects, using a centripetal time-to-collision calculated based on a centripetal relative velocity, the centripetal relative velocity being a relative velocity along a line segment connecting a position of each of these two moving objects.

(Configuration 2) The collision alert device described in Configuration 1, in which the output part outputs an alert in at least one of the two moving objects at a time when the centripetal time-to-collision is equal to or less than a predetermined threshold, and an intersecting point of two traveling lines is in front within a range of a predetermined prescribed distance from a present position of either of the two moving objects, the two traveling lines extending along a moving direction of each of the two moving objects with each of the two moving objects as a start point.

According to the collision alert device of Configuration 2, the output part can issue an alert, by quantitatively evaluating an extent of approach between moving objects, and accurately determining a possibility of colliding within a range of a prescribed distance from each of the two moving objects, while reducing a calculation load by narrowing down an evaluation target of a collision risk to within a range of the prescribed distance.

(Configuration 3) The collision alert device described in Configuration 2, in which the output part issues an alert in at least one of the two moving objects at a time when two traveling regions have a mutually overlapping region in front within a range of the prescribed distance from a present position of each of the two moving objects, the two traveling regions being belt-type regions each having a width equivalent to a body width of each corresponding moving object with each of the two traveling lines as a center line, and at a time when the centripetal time-to-collision is equal to or less than a predetermined threshold, even if the intersecting point is not within a range of the prescribed distance from a present position of each of the two moving objects.

According to the collision alert device of Configuration 3, even in a case where traveling lines of two moving objects do not intersect within a range of a prescribed distance, the output part can issue an alert by accurately determining a possibility of contact of these two moving objects.

(Configuration 4) The collision alert device described in Configuration 3, in which the output part issues an alert in at least one of the two moving objects at a time when an advancing direction of one of the two moving objects is opposite to an advancing direction of the other of the two moving objects, and a direction indicator of at least one moving object of the two moving objects shows a moving direction changing to a direction approaching the traveling line of the other moving object, and at a time when the centripetal time-to-collision becomes equal to or less than a predetermined threshold, even if the intersecting point is not within a range of the prescribed distance from a present position of each of the two moving objects, and the two traveling regions do not have a mutually overlapping region within a range of the prescribed distance from a present position of each of the two moving objects.

According to the collision alert device of Configuration 4, the output part can issue an alert, for two vehicles moving in opposing directions at an intersection, for example, by accurately determining a possibility of at least one vehicle approaching in front in an advancing direction of the other vehicle.

(Configuration 5) The collision alert device described in Configuration 3 or 4, in which the output part issues an alert in at least one of the two moving objects at a time when the two moving objects move in the same direction, and a direction indicator of at least one moving object of the two moving objects shows a moving direction changing to a direction approaching the traveling line of the other moving object, and at a time when the centripetal time-to-collision becomes equal to or less than a predetermined threshold, even if the intersecting point is not within a range of the prescribed distance from a present position of each of the two moving objects, and the two traveling regions do not have a mutually overlapping region within a range of the prescribed distance from a present position of each of the two moving objects.

According to the collision alert device of Configuration 5, the output part can issue an alert, in a leading vehicle and a following vehicle traveling in the same direction in a plurality of traffic lanes, for example, by accurately determining a possibility of the leading vehicle or the following vehicle approaching to the traffic lane of the following vehicle or the leading vehicle.

(Configuration 6) The collision alert device described in any one of Configurations 1 to 5, in which after an alert is issued in one moving object of the two moving objects, at a time when a moving velocity of the one moving object becomes zero, the output part stops an alert issued in the one moving object as a condition where there is no other moving object approaching the one moving object from behind in an advancing direction of the one moving object within a prescribed distance range from the one moving object.

According to the collision alert device of Configuration 6, attention for a possibility of a following moving object colliding can be attracted to a passenger of the moving object, the passenger having performed a stop operation due to the alert being issued within an interior of the moving object.

(Configuration 7) The collision alert device described in any one of Configurations 1 to 6, in which after an alert is issued in one moving object of the two moving objects, the output part continues the issuance of the alert in the one moving object, until there is no other traffic participant within a prescribed distance range from the one moving object, or until a moving velocity of the one moving object becomes zero.

According to the collision alert device of Configuration 7, in a case where traffic participants are densely packed in the surroundings of a vehicle, for example, an advancing direction of the vehicle is frequently changed in order to avoid traffic participants, and a situation of troubling a driver with a short alert repeating a number of times can be avoided.

(Configuration 8) The collision alert device described in any one of Configurations 1 to 7, in which the collision alert device is mounted in one moving object of the two moving objects, and the output part issues an alert in the one moving object.

According to the collision alert device of Configuration 8, a collision risk for a vehicle can be promptly issued to a driver, for example, by a collision alert device as a vehicle mounted device mounted in the vehicle.

(Configuration 9) A collision alert method executed by a computer of a collision alert device, the collision alert method includes the steps of repeatedly calculating a time-to-collision at a prescribed time interval, the time-to-collision being obtained by dividing a distance between moving objects by a relative velocity of two moving objects, the distance between moving objects being a distance between the two moving objects, and outputting an alert in at least one of the two moving objects as a condition of the time-to-collision being equal to or less than a predetermined threshold, wherein the relative velocity is a centripetal relative velocity of a moving velocity of each of the two moving objects, the centripetal relative velocity being calculated from a centripetal velocity that is a component along a line segment connecting a position of each of the two moving objects, and the time-to-collision is a centripetal time-to-collision obtained by dividing a distance between the two moving objects by the centripetal relative velocity.

According to the collision alert method of Configuration 9, even in a case where two moving objects move in respectively different directions, the collision alert device can appropriately notify a collision risk between these moving objects to a driver, by quantitatively evaluating an extent of approach between these moving objects, using a centripetal time-to-collision calculated based on a centripetal relative velocity, the centripetal relative velocity being a relative velocity along a line segment connecting a position of each of these two moving objects.

REFERENCE SIGNS LIST

1 collision alert device
2*a*, 2*b*, 2*c* moving object
3 communication network
4 camera
5*a*, 5*b* HMI device
6*a*, 6*b* wireless communication device
7*a*, 7*b* direction indicator
10 processor
11 memory
12 communication device
13 CTTC calculation part
14 condition determining part
15 alert output part
20, 22 road
21 intersection
Dab distance between moving objects
dr, ds prescribed distance
Lab line segment Lda, Ldb traveling line
Pab intersecting point
Ra, Rb range
TBa, TBb traveling region
Va, Vb moving velocity
Vca, Vcb centripetal velocity
wa, wb body width

What is claimed is:

1. A collision alert device, comprising a processor, wherein the processor:
receives information of a velocity and a moving direction from each of two moving objects at a prescribed time interval, and repeatedly calculates a time-to-collision at a prescribed time interval, the time-to-collision being obtained by dividing a distance between the two moving objects by a relative velocity based on the received information of the velocity and the moving direction of the two moving objects; and
outputs an alert in at least one of the two moving objects as a condition of the time-to-collision being equal to or less than a predetermined threshold, wherein
the relative velocity is a centripetal relative velocity of a moving velocity of each of the two moving objects, the centripetal relative velocity being calculated from a centripetal velocity that is a component along a line segment connecting a position of each of the two moving objects, and
the time-to-collision is a centripetal time-to-collision obtained by dividing the distance between the two moving objects by the centripetal relative velocity.

2. The collision alert device according to claim 1, wherein the processor outputs an alert in at least one of the two moving objects at a time when the centripetal time-to-collision is equal to or less than a predetermined threshold, and an intersecting point of two traveling lines is in front within a range of a predetermined prescribed distance from a present position of either of the two moving objects, the two traveling lines extending along the moving direction of each of the two moving objects with each of the two moving objects as a start point.

3. The collision alert device according to claim 2, wherein the processor issues an alert in at least one of the two moving objects at a time when two traveling regions have a mutually overlapping region in front within a range of the prescribed distance from a present position of each of the two moving objects, the two traveling regions being belt-type regions each having a width equivalent to a body width of each corresponding moving object with each of the two traveling lines as a center line, and at a time when the centripetal time-to-collision is equal to or less than a predetermined threshold, even if the intersecting point is not within a range of the prescribed distance from a present position of each of the two moving objects.

4. The collision alert device according to claim 3, wherein the processor issues an alert in at least one of the two moving objects at a time when an advancing direction of one of the two moving objects is opposite to an advancing direction of the other of the two moving objects, and operation information of a direction indicator of at least one moving object of the two moving objects shows the moving direction changing to a direction approaching the traveling line of the other moving object, and at a time when the centripetal time-to-collision becomes equal to or less than a predetermined threshold, even if the intersecting point is not within a range of the prescribed distance from a present position of each of the two moving objects, and the two traveling regions do not have a mutually overlapping region within a range of the prescribed distance from a present position of each of the two moving objects.

5. The collision alert device according to claim 3, wherein the processor issues an alert in at least one of the two moving objects at a time when the two moving objects move in a same direction, and operation information of a direction indicator of at least one moving object of the two moving objects shows the moving direction changing to a direction approaching the traveling line of the other moving object, and at a time when the centripetal time-to-collision becomes equal to or less than a predetermined threshold, even if the intersecting point is not within a range of the prescribed distance from a present position of each of the two moving objects, and the two traveling regions do not have a mutually overlapping region within a range of the prescribed distance from a present position of each of the two moving objects.

6. The collision alert device according to claim 1, wherein after an alert is issued in one moving object of the two moving objects, at a time when a moving velocity of the one moving object becomes zero, the processor stops the alert issued in the one moving object as a condition where there is no other moving object approaching the one moving object from behind in an advancing direction of the one moving object within a prescribed distance range from the one moving object.

7. The collision alert device according to claim 1, wherein after an alert is issued in one moving object of the two moving objects, the processor continues the issuance of the alert in the one moving object until there is no other traffic participant within a prescribed distance range from the one moving object or until a moving velocity of the one moving object becomes zero.

8. The collision alert device according to claim 1, wherein the collision alert device is mounted in one moving object of the two moving objects, and
the processor issues an alert in the one moving object.

9. A collision alert method executed by a computer of a collision alert device, the collision alert method comprising the steps of:
receiving information of a velocity and a moving direction from each of two moving objects at a prescribed time interval, and repeatedly calculating a time-to-collision at a prescribed time interval, the time-to-collision being obtained by dividing a distance between the two moving objects by a relative velocity based on the received information of the velocity and the moving direction of the two moving objects; and
outputting an alert in at least one of the two moving objects as a condition of the time-to-collision being equal to or less than a predetermined threshold, wherein
the relative velocity is a centripetal relative velocity of a moving velocity of each of the two moving objects, the centripetal relative velocity being calculated from a centripetal velocity that is a component along a line segment connecting a position of each of the two moving objects, and
the time-to-collision is a centripetal time-to-collision obtained by dividing the distance between the two moving objects by the centripetal relative velocity.

10. A collision alert device, comprising a processor, wherein the processor:

receives information of a velocity and a moving direction from each of two moving objects at a prescribed time interval and operation information of a direction indicator that is transmitted when the direction indicator of the corresponding moving object is operated;

repeatedly calculates a time-to-collision at a prescribed time interval, the time-to-collision being obtained by dividing a distance between the two moving objects by a relative velocity based on the received information of the velocity and the moving direction of the two moving objects; and outputs an alert in at least one of the two moving objects as a condition of the time-to-collision being equal to or less than a predetermined threshold, wherein the relative velocity is a centripetal relative velocity of a moving velocity of each of the two moving objects, the centripetal relative velocity being calculated from a centripetal velocity that is a component along a line segment connecting positions of the respective two moving objects, and the time-to-collision is a centripetal time-to-collision obtained by dividing a distance between the two moving objects by the centripetal relative velocity, wherein the processor outputs the alert to at least one of the two moving objects when the centripetal time-to-collision is equal to or less than a predetermined threshold value and an intersection of two traveling lines each of which extends from the corresponding moving object as a starting point along the moving direction of the corresponding moving object is located ahead within a predetermined distance from a current position of either of the two moving objects, and outputs an alarm to at least one of the two moving objects even when the intersection is not within the range of the predetermined distance from the current positions of the two moving objects, if the operation information of the direction indicator of at least one of the two moving objects indicates that the moving direction will change to a direction approaching the traveling line of the other moving object.

* * * * *